United States Patent [19]
Judd

[11] 4,280,143
[45] Jul. 21, 1981

[54] METHOD AND MEANS FOR SCALE-CHANGING AN ARRAY OF BOOLEAN CODED POINTS

[75] Inventor: Ian D. Judd, Chandlers Ford, England

[73] Assignee: International Business Machines Corporation, Armonk, N.Y.

[21] Appl. No.: 79,779

[22] Filed: Sep. 28, 1979

[30] Foreign Application Priority Data

Dec. 15, 1978 [GB] United Kingdom ............... 48628/78

[51] Int. Cl.³ .......................... H04N 1/00; H04N 1/04
[52] U.S. Cl. ..................................... 358/260; 358/287
[58] Field of Search ................. 358/260, 287, 77, 284, 358/166; 364/515

[56] References Cited

U.S. PATENT DOCUMENTS

| | | | |
|---|---|---|---|
| 3,976,982 | 8/1976 | Eiselen | 340/723 |
| 4,075,663 | 2/1978 | Wellemdorf | 358/287 |
| 4,124,871 | 11/1978 | Morrim | 358/287 |
| 4,210,936 | 7/1980 | Cimque et al. | 358/284 |
| 4,215,414 | 7/1980 | Huelsman | 358/284 |

Primary Examiner—Robert L. Richardson
Assistant Examiner—Edward L. Coles
Attorney, Agent, or Firm—R. Bruce Brodie

[57] ABSTRACT

Scale-changing method and apparatus is described for converting raster-scanned data received for example from a scanner 2 at a first picture element (pel) resolution to a second lower pel resolution for display for example on a CRT terminal 4. The apparatus includes a scale-changing means 3 which operates on receipt of the image data from the scanner 2 to perform a scale-change operation on the pels, first in the image row direction and then in the image column direction. The row scale-change operation is performed by scale-change projector 5 which functions to replace sub-groups of pels in the input image rows by single pels at its output. The number of pels in the sub-groups are determined by the degree of compression required to convert to the lower pel resolution. The significance of the output bits replacing the sub-groups is determined in accordance with predetermined algorithms having regard to the significance of pels in a selected horizontal 'window' of pels which includes the sub-group of pels under consideration. The image data emerging from projector 5, consolidated in the row direction, is further processed by a second scale-change projector 6 which performs the column scale-changing operation. The projector 6 operates in a similar fashion to projector 5 except that in this case sub-groups of pels in the image column direction are replaced by single pels at its output. Again, the size of the sub-groups are determined by the degree of compression required to convert to the lower pel resolution. The significance of the output pels replacing the sub-groups is determined as in the previous step in accordance with predetermined algorithm having regard to the significance of pels in a selected vertical 'window' of pels which includes the sub-group of pels under consideration.

3 Claims, 10 Drawing Figures

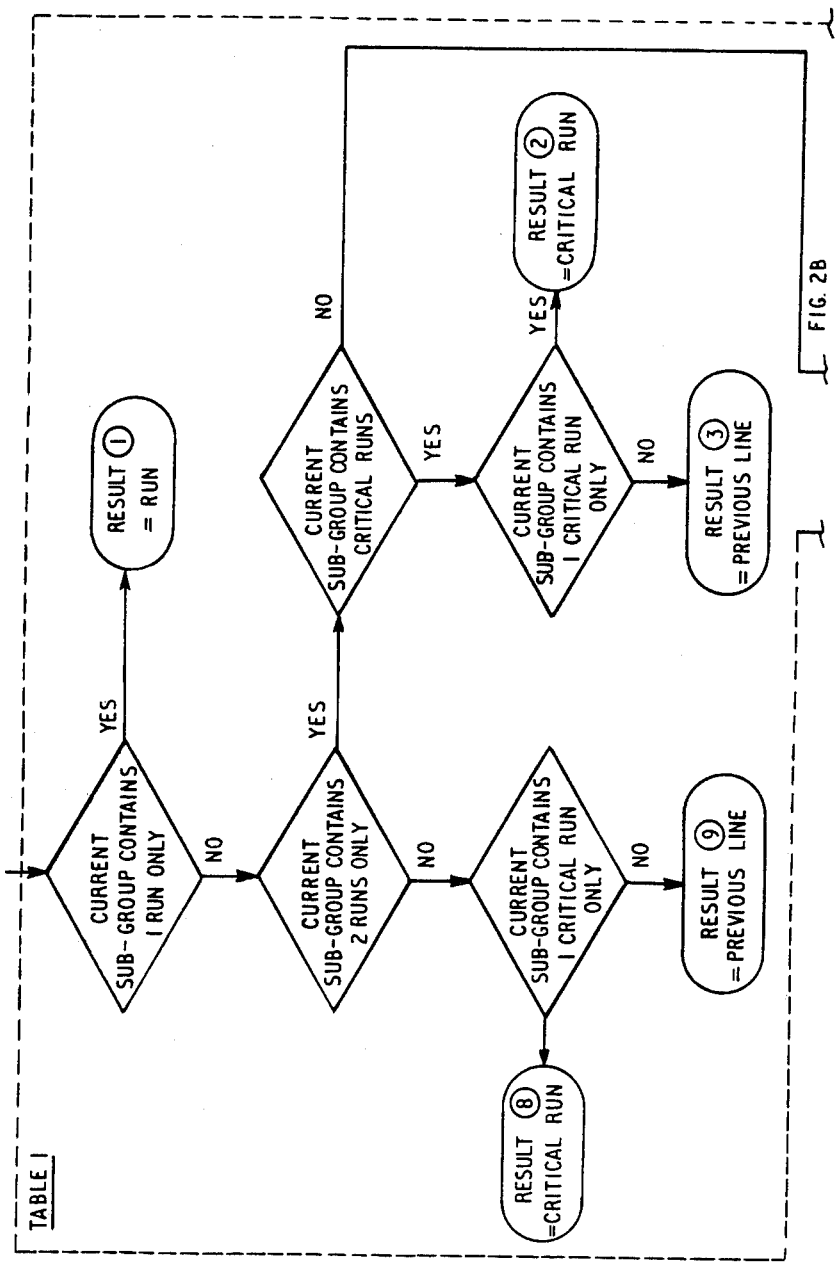

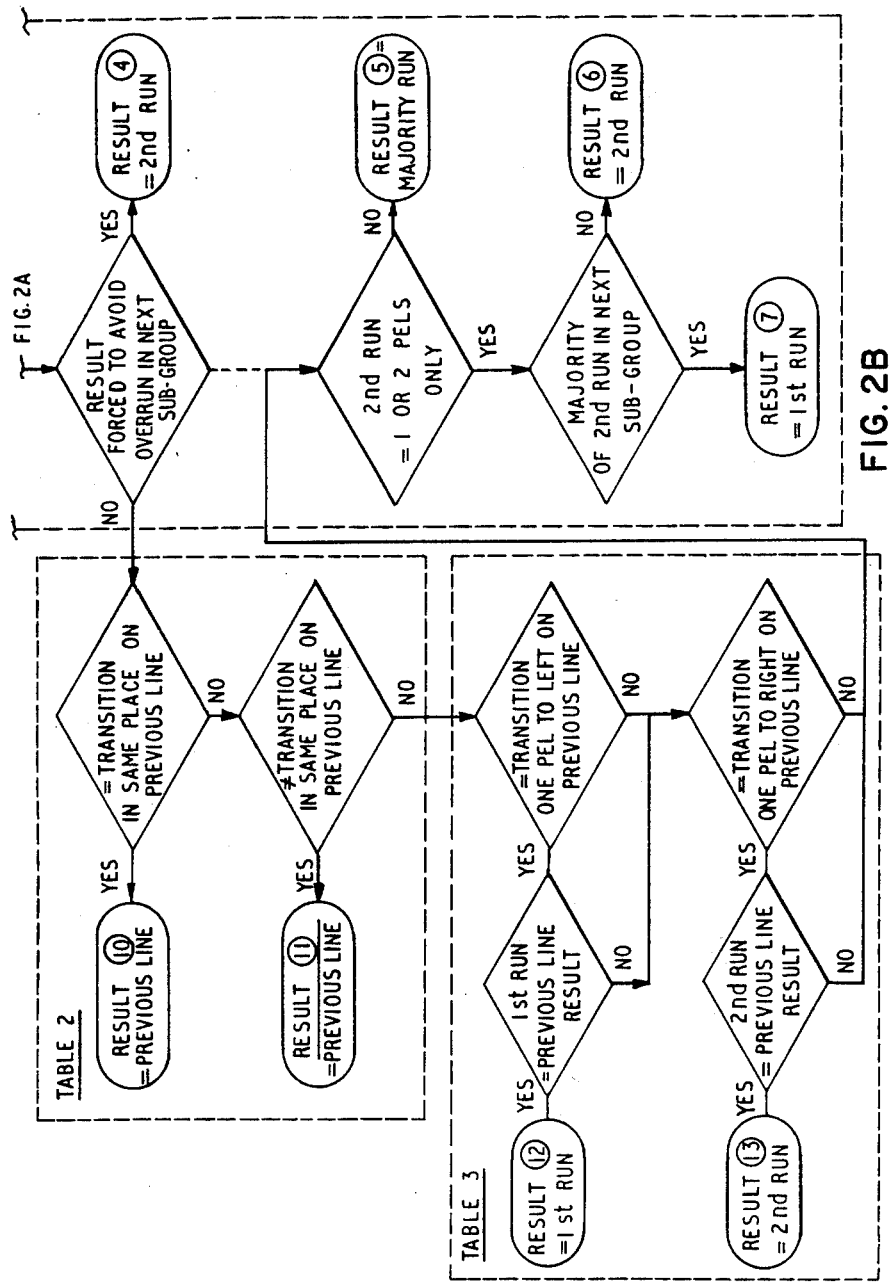

METHOD AND MEANS FOR SCALE-CHANGING AN ARRAY OF BOOLEAN CODED POINTS

FIELD OF USE

This invention relates to the scale changing of an array of Boolean coded points, and more particularly, to the rational number compression of said array into a smaller one for storage, transmission, or display purposes.

PRIOR ART DESCRIPTION

Information, for example alphanumerics or line drawings on a document, may be digitized by a scanner into a stream of bits representing two-valued (black/white) sample points or picture elements (pels) of the scanned image in successive lines of the raster scan. The digitized information may be stored electronically in a computer, recalled from store, reconstituted and either displayed on a display terminal, printed by a printer/plotter, or transmitted over a data link to another location.

A frequent requirement in such digital image systems is the reduction of the number of pels in an image after it has been scanned in order, for example, to reduce storage or transmission costs, to provide compatibility with a display head which has a lower pel resolution than the digitizing scanner, or to enhance the capture of fine detail. Data manipulation apparatus for producing such a reduction in pel resolution is described and claimed in our copending U.S. Patent Application Ser. No. 077,698, filed Sept. 21, 1979, entitled "Method and Means for Preserving Original Continuity/Discontinuity Among Same Colored Pel Clusters Upon Array Compression".

Briefly, this apparatus, as described in the co-pending application, includes a scale-changing means which functions to replace selected sub-groups of pels in the input image by single pels at its output. The significance of each single pel reflects the presence or absence of a pel representing part of an image object in the associated sub-group of pels. The number of pels in the selected sub-groups are determined by the degree of compression required to convert to the lower pel resolution. An important feature of the apparatus is that prior to scale-change, the input image data is modified so as to minimize merging of adjacent image objects as a result of the subsequent scale change operation. The image data modification is achieved in three stages. The scanned data is first processed by a data sensitive thinner which functions to detect narrow gaps between adjacent objects in the input image and to selectively delete edge pels from the objects in order to widen the gaps. This selectively thinned data is further thinned in order essentially to improve the appearance of the final projected image at the lower resolution. Finally, the thinned image data is processed by a data sensitive merge inhibit means which moves selected pels from sub-groups in which object merging will occur as a result of scale-changing to adjacent subgroups where merging will not occur. In all three stages, deletion or movement of a pel is inhibited if to do so would result in fragmentation of the associated image object. Further details of the apparatus and its operation may be obtained by reference to the aforementioned co-pending application.

Reference also should be made to Eiselen, U.S. Pat. No. 3,976,982, "Apparatus for Image Manipulation," issued Aug. 24, 1976. Eiselen discloses a method and means for replicating or removing selective ones of runs of like colored pels in order to enlarge or reduce an image for scale-changing purposes. As described at column 9, line 54 through column 10, line 46 and shown in FIG. 12, Eiselen requires that a group of pels in an input window be replaced by a single pel in an output window wherein the majority of pels have the same color value in the input window.

THE INVENTION

It is an object of the present invention to devise a method and means for the rational number compression of an array of Boolean coded points into a smaller array of points. It is a related object to minimize fragmentation of colored objects and their relative movement within an array field.

The foregoing objects are embodied in a method and means for the rational number $(1/a) \times (1/b)$ compression of an mxn array of Boolean coded points (black/white) into a smaller pxq array of points. The method steps comprise (1) forming a pxn array of Boolean points from the mxn array, p being less than or equal to m, by the encoding of each ith vector in row major order with reference to the ith−1 vector through the substitution of a less than 1 pels of the same color in a weighted position for each run of 1 or less pels, i lying in the range from 1 to n; and (2) forming a pxq array of Boolean points from the pxn array, q being less than or equal to n, by the encoding of each rth vector in column major order with reference to the rth−1 vector through the substitution of b less than 1 pels of the same color value in a weighted position for each run of 1 pels or less, r lying in the range from 1 to m.

Further according to the invention, the apparatus for receiving raster-scanned data as a series of input bits indicative of an mxn image array of picture elements (pels) at a first pel resolution and for converting the data into a series of output bits indicative of a pxq image array of pels at a second lower pel resolution, comprises first scale-changing means operable in a first dimension of said image array to convert said series of input bits to a series of intermediate output bits indicative of a pxn image array of pels and a second scale-changing means operable in a second dimension of said image array to convert said series of intermediate output bits to said series of output bits indicative of said pxq image array, the scale-changing operations performed by said first and second scale-changing means being in accordance with the aforementioned method steps.

In order that the invention may be fully understood, a preferred embodiment thereof will now be described by way of example with reference to the accompanying drawings. In the drawings:

BRIEF DESCRIPTION OF THE DRAWING

FIG. 2 shows a flow chart of method steps practiced by the apparatus shown in FIG. 1;

DESCRIPTION OF THE BEST MODE AND INDUSTRIAL APPLICABILITY

Figure 1:
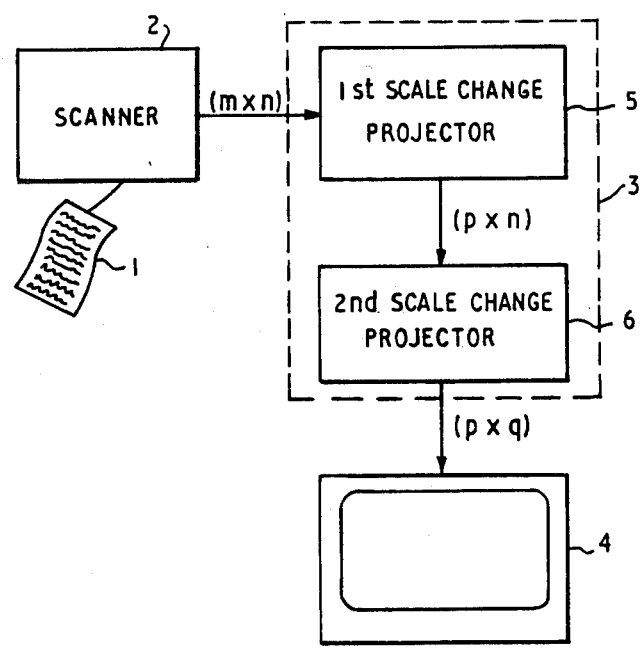
FIG. 1 shows a digital image system incorporating the present invention.

FIG. 1 shows a digital image system in which the present invention is incorporated. In this example, a document 1 is scanned at a high resolution (240 pels/inch) by a scanner 2. The resulting series of bits from the scanner is indicative of an (mxn) image array of pel sample points on the document surface selected by the scanner at the scanner resolution. The significance of each bit represents the state (black or white) of the corresponding pel on the document surface.

The series of bits from scanner 2 is supplied as input to data manipulation apparatus 3 which converts the data by scale-changing processes to a series of output bits indicative of an image array (pxq) of pels suitable for display by display head 4 which operates at a lower resolution (96 pels per inch) than the scanner. The conversion of pel resolution by the scale-changing processes of the data manipulation apparatus is performed in two stages. A first scale-change projector 5 performs logical operations in accordance with a set of predominantly 1-dimensional algorithms on the series of input bits to generate a partial or intermediate result in which the number of columns in the original image array (mxn) are reduced without changing the number of rows. A second scale-change projector 6 performs further logical operations in accordance with the same set of algorithms on the series of intermediate output bits emerging from the scale-change projector 5 to reduce the number of rows in the intermediate image array (pxn) without changing the number of columns. The series of output bits emerging from the scale-change projector 6 is indicative of an image array (pxq) at the pel resolution of the display head on which it is displayed. The degree of scale-change in this preferred embodiment of the invention determined by the set of algorithms is the same in both dimensions of the image array. Clearly, however, the degree of scale-change in the row direction could be different from that in the column direction if desired.

The scale-change conversion of the pels from an input row of the scanned image array (mxn) to an output row is achieved by dividing the input pels into appropriately sized fields or sub-groups. Each subgroup of pels is then replaced by one pel in the output. These sub-groups are of unequal size if the scale-change ratio is not integral. Thus, in the present example of change in resolution from 240 pels/inch at the input to 96 pels/inch at the output, the sub-groups are alternatively 2 pels and 3 pels wide giving the required average ratio of 2.5 to 1. Similarly scale-change conversion of the pels from an input column of the intermediate image array (pxn) to an output column is achieved by replacing alternate sub-groups of 2 pels and 3 pels each by one pel in the output.

During the operation of the first scale-change projector 5, the rows of the input image are processed independently and sequentially from top to bottom. The sub-groups of pels in each row are processed sequentially from left to right according to the set of algorithms which determine whether the significance of the resultant output pels, each of which replaces a corresponding sub-group of pels at the input, should be black or white.

The algorithm for scale-change conversion has been designed with the primary aim of maintaining wherever possible the existence of white-to-black and black-to-white transitions. This is equivalent to maintaining the existence of all black and white 'runs' which are the input pels between a pair of opposite polarity transitions. Thus, if a 'run' completely fills or overlaps a field, or sub-group of pels, then the output pel is made the same color as the run of pels it replaces. Conversely, the algorithm does not permit a 'run' to be represented by an output bit which replaces a sub-group of pels not included, at least in part, in the 'run'. If a 'run' ends within a current sub-group of pels under investigation and has not yet been represented in the result, then it is said to be 'critical' since this sub-group is the last, or even the only, sub-group of pels in which the 'run' can be represented. If the current subgroup contains two or more 'critical' runs then an 'overrun' condition is said to exist. If the subgroup contains two 'non-critical' runs then a 'dilemma' is said to exist. In this case one or more runs must be dropped from the result.

Where non-integral scale-change ratios, such as in this preferred embodiment, are handled by the algorithm using different sized sub-groups of pels as described, some distortion of the output image may result. This can be avoided, however, since with any scale-change ratio x:y in which x>y, the input data bits can each be considered as being duplicated y times. The resulting constrained data stream can then be divided into equally-sized sub-groups each x bits wide. By this means symmetric scale-change conversion from input to output is achieved.

The following examples illustrate the effect of this notional duplication for the purposes of determining the significance of the output pels needed to replace 2 pel and 3 pel sub-groups. The data pels are shown on the left-hand side divided alternatively into 2 pel and 3 pel sub-groups by oblique lines. Each pel (x) is duplicated and shown in 5 pel sub-groups on the right-hand side, thus:

/XX/▨XX/X ⟶ /XXXX▨/▨XXXX/XX

The selected phasing of the scale-change sub-group boundaries with respect to input data has an effect on the pel position in the duplicated output. Thus, a left-hand pel in a 3 pel sub-group occurs as 1 pel in the corresponding 5 pel sub-group and 1 pel in the preceding 5 pel sub-group. The algorithms used in the present invention are designed to determine the significance of output bits as though the input bits had been duplicated in this manner to extend across sub-group boundaries, although of course in practice actual duplication of bits does not take place.

The basic algorithmic rules selected for the operation of the invention in accordance with this embodiment may be summarized as follows:

1. input sub-group containing only one run in replaced by a single output bit of the same significance as the bits forming the run;
2. input sub-group containing two or three runs only one of which is critical is replaced by a single output bit of the same significance as the bits forming the critical run;

3. input sub-group containing two non-critical runs (dilemma condition) is generally replaced by a single output bit of the same significance as the majority of bits in the input sub-group. An exception to this is when the selection of a particular significance would cause an 'overrun' condition in the next sub-group which could otherwise be avoided. In this case an output bit of the opposite significance is selected to replace the input sub-group. A second exception may occur when the second run has a total length of one pel only. In this case the output bit has the significance of the second run;

4. input sub-group containing two or more critical runs (overrun condition) is replaced by an output bit of the same significance as that previously selected for the output bit for the corresponding sub-group in the previous line.

In order to assist in the understanding of the basic algorithm, the decisions of the significance of the output bits selected for all possible combinations of input bits are summarized in a flow chart shown as FIG. 2. There are nine possible different routes associated with the basic algorithm so far described and the corresponding results are labelled result 1 to result 9 on the chart for ease of reference.

The output bits selected for all possible input bit patterns by the basic algorithm can be determined by reference to TABLE 1 below. The columns of data represent the following information:

column A represents the width of the current subgroup under investigation (0=2 pel sub-group, 1=3 pel sub-group);

column B contains the binary values of the next six pels in the row starting with the first pel in the current sub-group (0=white pel, 1=black pel, X=white or black pel);

column C contains the significance of the output pel derived for the previous sub-group of input pels in that row (0=white pel, 0=black pel, X=white or black pel);

column D contains the binary values of five input pels from the previous scan row starting one pel position to the left of the corresponding current sub-group in that row (0=white pel, 1=black pel, X=white or black pel); Note: This information is not required by the basic algorithm but is included in TABLE 1 in order to be consistent with other tables to be described later.

column E contains the significance of the output pel derived for the corresponding sub-group of input pels in the previous row (0=white pel, 1=black pel, X=white or black pel);

column F contains the significance of the output pel derived for the current sub-group of input pels under investigation (0=white pel, 1=black pel); column G contains remarks describing the nature of the bit information in the sub-group under investigation in the terms defined above, and in the case of 'dilemma' and 'overrun' conditions, the reason for the selection of the significance of the corresponding output bit; and column H contains the corresponding result box number from the flow chart shown in FIG. 2 from which the algorithmic decision route can be derived.

TABLE 1

| A | B | C | D | E | F | G | H |
|---|---|---|---|---|---|---|---|
| 0 | 000XXX | X | XXXXX | X | 0 | 1 run only | 1 |
| 0 | 001XXX | 1 | XXXXX | X | 0 | 2 runs, 1st critical | 2 |
| 0 | 001X01 | 0 | XXXXX | X | 1 | 2 non-critical runs, avoid overrun | 4 |
| 0 | 001000 | 0 | XXXXX | X | 1 | dilemma, get early | 6 |
| 0 | 001010 | 0 | XXXXX | X | 1 | 2 non-critical runs | 6 |
| 0 | 001011 | 0 | XXXXX | X | 1 | 2 non-critical runs, avoid overrun | 4 |
| 0 | 001100 | 0 | XXXXX | X | 0 | dilemma, majority | 7 |
| 0 | 00111X | 0 | XXXXX | X | 0 | dilemma, majority | 5 |
| 0 | 010XXX | 0 | XXXXX | X | 1 | 3 runs, 2nd critical | 8 |
| 0 | 010XXX | 1 | XXXXX | 0 | 0 | overrun, 2 critical runs, = previous line | 9 |
| 0 | 010XXX | 1 | XXXXX | 1 | 1 | overrun, 2 critical runs, = previous line | 9 |
| 0 | 0110XX | 1 | XXXXX | X | 0 | 2 runs, 1st critical | 2 |
| 0 | 0110X1 | 0 | XXXXX | X | 1 | 2 non-critical runs, avoid overrun | 4 |
| 0 | 011000 | 0 | XXXXX | X | 1 | dilemma, majority | 6 |
| 0 | 011010 | 0 | XXXXX | X | 1 | 2 non-critical runs | 5 |
| 0 | 0111XX | 1 | XXXXX | X | 0 | 2 runs, 1st critical | 2 |
| 0 | 011100 | 0 | XXXXX | X | 1 | dilemma, majority | 5 |
| 0 | 011101 | 0 | XXXXX | X | 1 | 2 non-critical runs, avoid overrun | 4 |
| 0 | 01111X | 0 | XXXXX | X | 1 | dilemma, majority | 5 |
| 1 | 000XXX | X | XXXXX | X | 0 | 1 run only | 1 |
| 1 | 0010XX | 0 | XXXXX | X | 1 | 2 runs, 2nd critical | 2 |
| 1 | 0010XX | 1 | XXXXX | 0 | 0 | overrun, 2 critical runs, = previous line | 3 |
| 1 | 0010XX | 1 | XXXXX | 1 | 1 | overrun, 2 critical runs, = previous line | 3 |
| 1 | 0011XX | 1 | XXXXX | X | 0 | 2 runs, 1st critical | 2 |
| 1 | 001100 | 0 | XXXXX | X | 1 | dilemma, majority | 6 |
| 1 | 001101 | 0 | XXXXX | X | 1 | 2 non-critical runs, avoid overrun | 4 |
| 1 | 00111X | 0 | XXXXX | X | 0 | dilemma, majority | 5 |
| 1 | 0100XX | 0 | XXXXX | X | 1 | 3 runs, 2nd critical | 8 |
| 1 | 0100XX | 1 | XXXXX | 0 | 0 | overrun, 2 critical runs, = previous line | 9 |
| 1 | 0100XX | 1 | XXXXX | 1 | 1 | overrun, 2 critical runs, = previous line | 9 |
| 1 | 0101XX | X | XXXXX | 0 | 0 | overrun, ⅔ critical runs, = previous line | 9 |
| 1 | 0101XX | X | XXXXX | 1 | 1 | overrun, ⅔ critical runs, = previous line | 9 |
| 1 | 0110XX | 0 | XXXXX | X | 1 | 2 runs, 2nd critical | 2 |
| 1 | 0110XX | 1 | XXXXX | 0 | 0 | overrun, 2 critical runs, = previous line | 3 |
| 1 | 0110XX | 1 | XXXXX | 1 | 1 | overrun, 2 critical runs, = previous line | 3 |
| 1 | 0111XX | 1 | XXXXX | X | 0 | 2 runs, 1st critical | 2 |
| 1 | 011100 | 0 | XXXXX | X | 1 | dilemma, majority | 5 |
| 1 | 011101 | 0 | XXXXX | X | 1 | 2 non-critical runs, avoid overrun | 4 |

TABLE 1-continued

| A | B | C | D | E | F | G | H |
|---|---|---|---|---|---|---|---|
| 1 | 01111X | 0 | XXXXX | X | 1 | dilemma, majority | 5 |

It will be observed that the above table contains only half of the possible combinations of input bits. Since the algorithm is symmetrical with respect to input data, that is it responds in the opposite way for transitions from black to white as for transitions from white to black, the other half of the table may be determined simply by inverting the binary values shown in columns B,C,D,E and F.

The primary objective of any scale-changing process is to maintain reasonable legibility of the input image after projection to the lower resolution. It is desirable therefore to avoid fragmentation of entities in the input data or the introduction of spurious movements in the positions of vertical edges as a result of projection. Accordingly, when assigning output pels in the case of dilemma conditions the previous row is inspected for single transitions in the current operating window and, unless a result is forced by a potential overrun in the next sub-group, the current output pel is selected so as to maintain existing vertical edges and forty-five degree connections. If more than one transition exists in the previous line data visible in the current operating window then the output pel is selected according to the rules of the basic algorithm for dilemma conditions. These extensions to the basic algorithm are included in the flow chart shown in FIG. 2 and add two additional routes (result 10 and result 11) to the nine already dealt with. The operation of the extension to the basic algorithm is summarized in TABLE 2 below.

TABLE 2

| A | B | C | D | E | F | G | H |
|---|---|---|---|---|---|---|---|
| 0 | 001000 | 0 | X1100 | 0 | 1 | maintain 45 degree connectivity | 11 |
| 0 | 001000 | 0 | X1100 | 1 | 0 | maintain 45 degree connectivity | 11 |
| 0 | 001000 | 0 | 0001X | 0 | 0 | maintain smooth edge | 10 |
| 0 | 001000 | 0 | 0001X | 1 | 1 | maintain smooth edge | 10 |
| 0 | 001000 | 0 | 1X01X | 0 | 0 | maintain smooth edge | 10 |
| 0 | 001000 | 0 | 1X01X | 1 | 1 | maintain smooth edge | 10 |
| 0 | 001100 | 0 | X1100 | 0 | 1 | maintain 45 degree connectivity | 11 |
| 0 | 001100 | 0 | X1100 | 1 | 0 | maintain 45 degree connectivity | 11 |
| 0 | 001100 | 0 | 0001X | 0 | 0 | maintain smooth edge | 10 |
| 0 | 001100 | 0 | 0001X | 1 | 1 | maintain smooth edge | 10 |
| 0 | 001100 | 0 | 1X01X | 0 | 0 | maintain smooth edge | 10 |
| 0 | 001100 | 0 | 1X01X | 1 | 1 | maintain smooth edge | 10 |
| 0 | 00111X | 0 | X1100 | 0 | 1 | maintain 45 degree connectivity | 11 |
| 0 | 00111X | 0 | X1100 | 1 | 0 | maintain 45 degree connectivity | 11 |
| 0 | 00111X | 0 | 0001X | 0 | 0 | maintain smooth edge | 10 |
| 0 | 00111X | 0 | 0001X | 1 | 1 | maintain smooth edge | 10 |
| 0 | 00111X | 0 | 1X01X | 0 | 0 | maintain smooth edge | 10 |
| 0 | 00111X | 0 | 1X01X | 1 | 1 | maintain smooth edge | 10 |
| 0 | 011000 | 0 | X0100 | 0 | 0 | maintain smooth edge | 10 |
| 0 | 011000 | 0 | X0100 | 1 | 1 | maintain smooth edge | 10 |
| 0 | 011000 | 0 | X011X | 0 | 0 | maintain smooth edge | 10 |
| 0 | 011000 | 0 | X011X | 1 | 1 | maintain smooth edge | 10 |
| 0 | 011000 | 0 | X100X | 0 | 1 | maintain 45 degree connectivity | 11 |
| 0 | 011000 | 0 | X100X | 1 | 0 | maintain 45 degree connectivity | 11 |
| 0 | 011100 | 0 | X0100 | 0 | 0 | maintain smooth edge | 10 |
| 0 | 011100 | 0 | X0100 | 1 | 1 | maintain smooth edge | 10 |
| 0 | 011100 | 0 | X011X | 0 | 0 | maintain smooth edge | 10 |
| 0 | 011100 | 0 | X011X | 1 | 1 | maintain smooth edge | 10 |
| 0 | 011100 | 0 | X100X | 0 | 1 | maintain 45 degree connectivity | 11 |
| 0 | 011100 | 0 | X100X | 1 | 0 | maintain 45 degree connectivity | 11 |
| 0 | 01111X | 0 | X0100 | 0 | 0 | maintain smooth edge | 10 |
| 0 | 01111X | 0 | X0100 | 1 | 1 | maintain smooth edge | 10 |
| 0 | 01111X | 0 | X011X | 0 | 0 | maintain smooth edge | 10 |
| 0 | 01111X | 0 | X011X | 1 | 1 | maintain smooth edge | 10 |
| 0 | 01111X | 0 | X100X | 0 | 1 | maintain 45 degree connectivity | 11 |
| 0 | 01111X | 0 | X100X | 1 | 0 | maintain 45 degree connectivity | 11 |
| 1 | 001100 | 0 | X1100 | 0 | 1 | maintain 45 degree connectivity | 11 |
| 1 | 001100 | 0 | X1100 | 1 | 0 | maintain 45 degree connectivity | 11 |
| 1 | 001100 | 0 | 0001X | 0 | 0 | maintain smooth edge | 10 |
| 1 | 001100 | 0 | 0001X | 1 | 1 | maintain smooth edge | 10 |
| 1 | 001100 | 0 | 1X01X | 0 | 0 | maintain smooth edge | 10 |
| 1 | 001100 | 0 | 1X01X | 1 | 1 | maintain smooth edge | 10 |
| 1 | 00111X | 0 | X1100 | 0 | 1 | maintain 45 degree connectivity | 11 |
| 1 | 00111X | 0 | X1100 | 1 | 0 | maintain 45 degree connectivity | 11 |
| 1 | 00111X | 0 | 0001X | 0 | 0 | maintain smooth edge | 10 |
| 1 | 00111X | 0 | 0001X | 1 | 1 | maintain smooth edge | 10 |
| 1 | 00111X | 0 | 1X01X | 0 | 0 | maintain smooth edge | 10 |
| 1 | 00111X | 0 | 1X01X | 1 | 1 | maintain smooth edge | 10 |
| 1 | 011100 | 0 | X0100 | 0 | 0 | maintain smooth edge | 10 |
| 1 | 011100 | 0 | X0100 | 1 | 1 | maintain smooth edge | 10 |
| 1 | 011100 | 0 | X011X | 0 | 0 | maintain smooth edge | 10 |
| 1 | 011100 | 0 | X011X | 1 | 1 | maintain smooth edge | 10 |
| 1 | 011100 | 0 | X100X | 0 | 1 | maintain 45 degree connectivity | 11 |
| 1 | 011100 | 0 | X100X | 1 | 0 | maintain 45 degree connectivity | 11 |
| 1 | 01111X | 0 | X0100 | 0 | 0 | maintain smooth edge | 10 |
| 1 | 01111X | 0 | X0100 | 1 | 1 | maintain smooth edge | 10 |

TABLE 2-continued

| A | B | C | D | E | F | G | H |
|---|---|---|---|---|---|---|---|
| 1 | 01111X | 0 | X011X | 0 | 0 | maintain smooth edge | 10 |
| 1 | 01111X | 0 | X011X | 1 | 1 | maintain smooth edge | 10 |
| 1 | 01111X | 0 | X100X | 0 | 1 | maintain 45 degree connectivity | 11 |
| 1 | 01111X | 0 | X100X | 1 | 0 | maintain 45 degree connectivity | 11 |

All possible input bit patterns which lead to the maintenance of a vertical edge (result 10) or a forty-five degree connection (result 11) following detection of a dilemma condition may be determined from the above table. The significance of the information in the various columns of the table is the same as for TABLE 1. Again only half of the possible input conditions are shown in the table as before, the other half may be determined simply by inverting the binary values shown in columns B,C,D,E and F.

Although the basic algorithm produces acceptable results for the majority of input bit patterns, there are some patterns which lead to distortion of the output image if the basic rules are followed. For example, consider the input bit pattern 00/100/0 following a previous sub-group result bit of significance 0. From TABLE 1 it is seen that the current 2 pel sub-group under consideration is set to a pel of significance 1 for any valued bit combination in the previous scan row. Generally, this is an acceptable decision. However, consideration of a previous line bit pattern X/01/1X in which the corresponding 2 pel sub-group 01 was replaced by a result pel of significance 0 has the effect of changing the slope of the edge in the input image from downwards left to right to downwards right to left in the output image. The decision in this particular example derived from the general algorithm is clearly undesirable and a further modification to the basic algorithm is made to overcome the problem by forcing the result pel to copy the result pel for the corresponding sub-groups in the previous scan row. The modifications are included in the flow chart shown in FIG. 2 as two further routes (result 12 and result 13). All the exceptions to the basic algorithm which lead to edge direction changes as described above are summarized in TABLE 3 below.

TABLE 3

| A | B | C | D | E | F | G | H |
|---|---|---|---|---|---|---|---|
| 0 | 001000 | 0 | X011X | 0 | 0 | result forced to right | 12 |
| 0 | 001100 | 0 | X011X | 0 | 0 | result forced to right | 12 |
| 0 | 00111X | 0 | X011X | 0 | 0 | result forced to right | 12 |
| 0 | 011000 | 0 | X001X | 1 | 1 | result forced to left | 13 |
| 0 | 011100 | 0 | X001X | 1 | 1 | result forced to left | 13 |
| 0 | 01111X | 0 | X001X | 1 | 1 | result forced to left | 13 |
| 1 | 001100 | 0 | X0111 | 0 | 0 | result forced to right | 12 |
| 1 | 00111X | 0 | X0111 | 0 | 0 | result forced to right | 12 |
| 1 | 011100 | 0 | X001X | 1 | 1 | result forced to left | 13 |
| 1 | 01111X | 0 | X001X | 1 | 1 | result forced to left | 13 |

The significance of the information in the various columns of the table is the same as for TABLE 1 and 2. Again only half of the possible input conditions are shown in the table and as before, the other half may be determined simply by inverting the binary values shown in columns B,C,D,E and F.

This completes the description of the algorithm and its modifications used in this preferred embodiment to determine the significance of result pels in the projected output image at the lower pel resolution. The preferred arrangement for the implementation of the scale-change algorithm will now be described.

Figure 3:
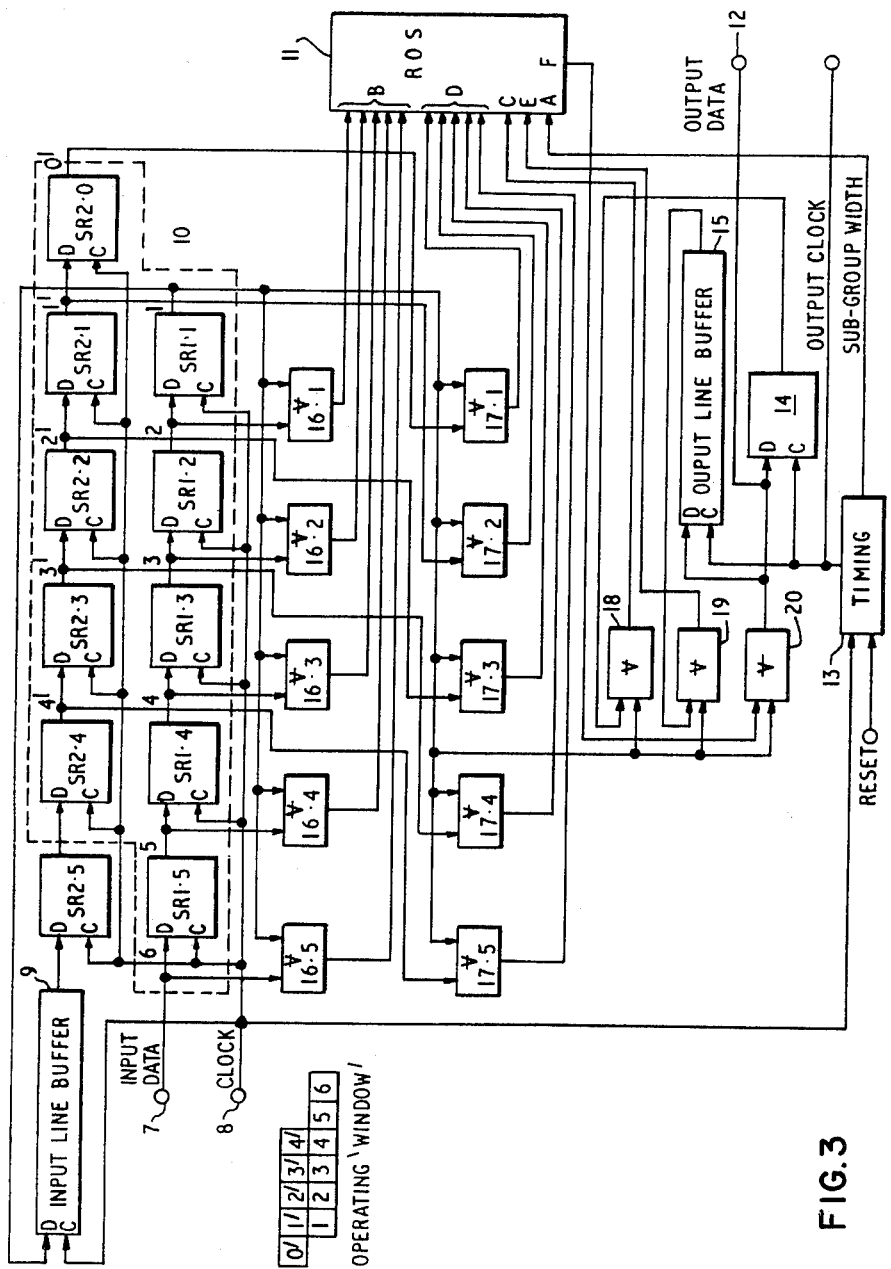
FIG. 3 shows apparatus for accomplishing the horizontal scale-change function.

The input image data received as a serial raster-scanned bit stream is supplied to input terminal 7 of the apparatus shown in FIG. 3 for performing scale-changing in the row direction. The input bit stream supplied to terminal 7 is clocked each pel time by leading edges of data clock pulses (waveform (a) FIG. 5) supplied to clock terminal 8 through two serially connected shift registers SR1 and SR2. An input line buffer 9 connected between the output of shift register SR1 and the input of shift register SR2 introduces a delay to the bit stream such that corresponding shift register stages in the two registers contain at any instant bits representing correspondingly positioned pels from successive raster-scan lines. The operational 'window' of input image pels defined by the algorithm is derived from shift register stages SR1.1 to SR1.5 for the current row and shift register stages SR2.0 to SR2.4 for the previous row. The position of the 'window' pels with respect to the image data is shown in FIG. 3 with the pels numbered 1 to 6 in the current row and 0' to 4' in the preceding row. The corresponding shift register stages from which the 'window' is derived is shown in dotted outline 10 with the outputs from the stages similarly numbered 1 to 6 and 0' to 4' for ease of identification. It should be noted that the first pel of the sub-group of pels under investigation is always represented by the bit contained in shift register stage SR1.1. Further no stage is required for the sixth pel in the current row since the bit representing this pel is obtained from the input to stage SR1.5. It will be recalled from previous discussion of the algorithm and as seen from the 'window' layout in FIG. 3 that the five pels from the previous row are displaced in the actual image one pel position to the left. The shift register SR2 is therefore displaced one stage to the right with respect to shift register SR1.

In the simplest arrangement for implementing the algorithm, the eleven input image bits representing the eleven pels in the 'window' are supplied together with a single bit representing the result obtained for the previous sub-group in the current row, a single bit representing the result obtained for the corresponding sub-group on the previous row, and a single bit representing the width of the current sub-group as an address word to the input of read-only store (ROS) 11.

ROS 11 contains all the single bit output words derived by the algorithm and summarized in the three tables required to replace the various input bit combinations. Interrogation of ROS 11 with the input address results in an output bit appearing at ROS output. Since the input bit pattern supplied to ROS 11 changes every pel time, a corresponding output bit appears every pel time at the ROS output.

Figure 4:
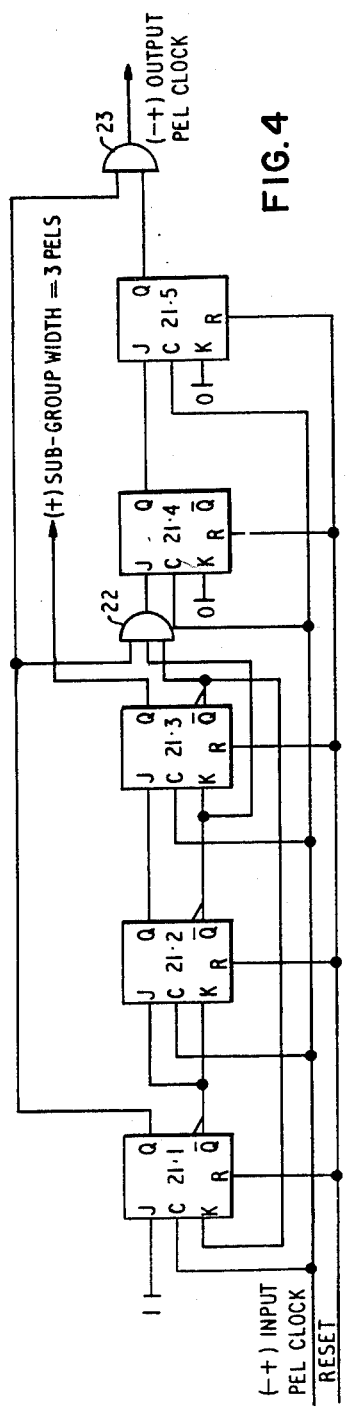
FIG. 4 shows details of timing circuits forming part of the horizontal scale-changing apparatus of FIG. 3.
Figure 5:
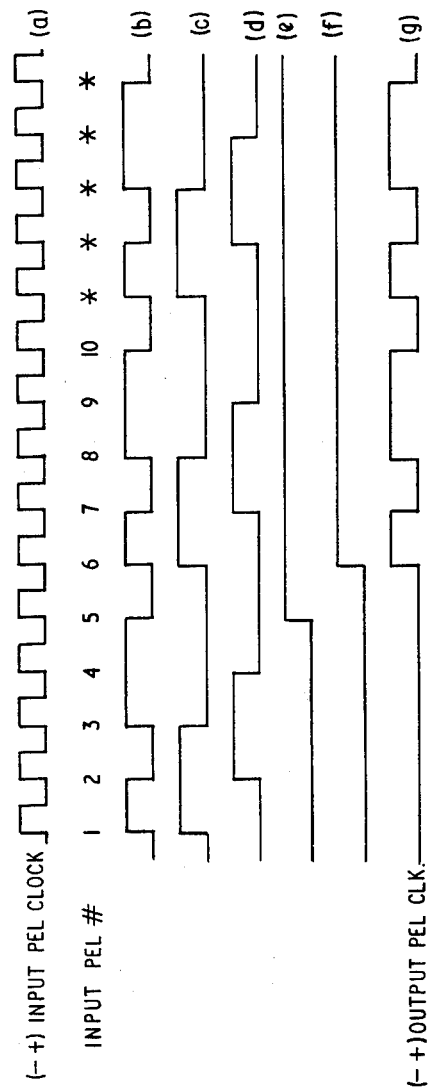
FIG. 5 shows signal waveforms at various points in the apparatus of FIG. 3.

Accordingly, the output bit stream at terminal 12 is sampled under control of an output pel clock signal (waveform (d) FIG. 5) alternately every 2 and 3 input pel time as required by the algorithm. The output pel clock signal is supplied by timing circuits 13 the operation of which will be described later with reference to FIGS. 4 and 5. The sampled output bit stream represents the input image after scale-change in the row direction.

Each output bit from ROS 11 is supplied as input to a result latch 14 which is also clocked alternately every 2 and 3 input pel times by the output pel clock. The delay introduced by the clocking of the result latch means that its output represents the result bit for the previous sub-group on the current line under investigation. The output from the result latch 14 is supplied as part of the address to ROS 11.

Each output bit from ROS 11 is also supplied as input to an output line buffer 15 which is also clocked by the output pel clock from timing circuits 13. The delay introduced by buffer 15 is such that a bit at its output represents the result bit for the sub-group of pels on the previous row corresponding in position to the current sub-group under investigation. The output from buffer 15 is also supplied as part of the input address to ROS 11.

With this simple arrangement, the ROS is required to store 16384 words in order to provide an output bit for each of all the possible input combinations on the fourteen input address lines. The black/white symmetry of the algorithm however enables the number of words to be halved. It will be recalled that the tables described above contain only bit patterns in which the first pel of the investigated sub-group is a '0' since the remaining patterns in which the first pel is a '1' can be obtained by simple bit inversion. Thus if the first pel is a '0' then the bit pattern is represented in the tables and if it is a '1' then the inverse of the bit pattern is represented. This first pel is represented by the bit contained in shift register stage SR1.1 and its significance either 0 or 1 indicates whether the actual input bit pattern or its inverse is contained in the tables.

In the preferred form of apparatus shown in FIG. 3, the output from shift register stage SR1.1 is not used directly as part of the ROS address but instead is used to invert the remaining thirteen inputs and the ROS output if it is a '1' or to pass the inputs unchanged to the ROS and not invert the ROS output if it is a '0'. Accordingly, the ROS need only store the 8192 words summarized in the tables. The selective inversion of the thirteen address inputs is achieved automatically simply by exclusively OR-ing the first bit from the current sub-group with the bits supplied for the twelve address inputs. The output from shift register SR1.1 is therefore supplied as one input to exclusive OR (XOR) circuits 16.1 to 16.5 which obtain their second inputs respectively from the outputs from shift register stages SR1.2 to SR1.5 and the input to stage SR1.5; whereby the bits representing the pels in the current line are inverted in response to the occurrence of a 1 bit in shift register stage SR1.1. Similarly, the output from SR1.1 is supplied as input to XOR circuits 17.1 to 17.5 which receive their second inputs respectively from shift register stages SR2.0 to SR2.4 whereby the bits representing the pels in the previous line are inverted in response to a 1 bit in stage SR1.1. The output from stage SR1.1 is further supplied as one input to XOR circuit 18 which receives as second input the output from result latch 14 whereby the bit representing the result for the previous sub-group on the current line is selectively inverted. The output from stage SR1.1 is further supplied as one input to XOR circuit 19 which receives as second input the output from output line buffer 15 whereby the bit representing the result for the corresponding sub-group on the previous line is selectively inverted. Finally, the output from stage SR1.1 is connected as one input to XOR circuit 20 which receives the output from ROS 11 as second input, whereby the result bit supplied by the ROS is inverted wherever a 1 bit is present in shift register stage SR1.1.

Reset lines are omitted from most of the various components forming the apparatus of FIG. 3. In practice, each latch forming the individual stages of the shift registers SR1 and SR2, the result latch 14 and the two line buffers 9 and 15 are provided with reset inputs. It will be apparent that for the apparatus to function correctly, it is necessary to clear both line buffers so that they contain all 0's, and to reset all latches to 0 at the start of each new image input. Further, the latch forming shift register stage SR2.0 and the result latch 14 must be reset to 0 at the start of each new line scan of the image. Five extra clock pulses with a pel value of '0' must be provided at the end of each line in order to flush the shift register SR1. The reset pulses and the extra clock pulses can be simply derived using standard logical design.

The timing circuits 13 are seen from FIG. 4 to consist of five interconnected JK flip-flops (FF) 21 and two AND gates 22 and 23. The J input to FF21.1 is permanently tied to an up or '1' level and the K inputs to FF21.4 and 21.5 are permanently tied to a down or '0' level. The input data clock pulses, waveform (a) in FIG. 5, are supplied in parallel to the C inputs of all the flip-flops. Since the scale-change ratio in this embodiment is 5:2, the number of input pels per scan line should be a multiple of five. The example chosen to illustrate the operation of the timing circuits therefore shows 10 pels in the input line plus five extra pels (marked *) added to the end of the line and given the value 0 in order to clear the window register SR1. All flip-flops are reset to 0 at the start of each line scan.

The Q output from FF21.1 is shown as waveform (b) in FIG. 5, the Q output from FF21.2 as waveform (c), and the Q output from FF21.3 as waveform (d). It is seen that waveform (d) is alternately at an up or '1' level for the duration of 2 input pel bit times and at a down or '0' level for 3 input pel bit times. This signal is used therefore as the sub-group width signal required as an address bit for ROS 11 in the apparatus shown in FIG. 3.

The output pel clock signal required to clock the result latch 14 and output line buffer 15 is derived from the Q output from FF21.1. Since no output pel clock signal should occur until the current row shift register SR1 is loaded, the signal must be suppressed during the first five pel bit times for each scan row. This is accomplished by the logical combination of the Q output from FF21.1, the not Q output from FF21.2, and the not Q output from FF21.3 by AND-gate 22, the output from which is supplied as J input to FF21.4. The resultant Q output from FF21.4 is shown as waveform (e) in FIG. 5 as an up or '1' level after pel 4 bit time. The Q output from FF21.4 is connected to the J input of FF21.5 so that the Q output from the latter becomes an up or '1' level one pel bit time later. The Q output from FF21.5 is shown as waveform (f) in FIG. 5. The output pel clock signal shown as waveform (g) in FIG. 5 is derived as a result of the logical combination of the Q outputs from FF21.1 and FF21.5 by AND-gate 23.

Figure 6:
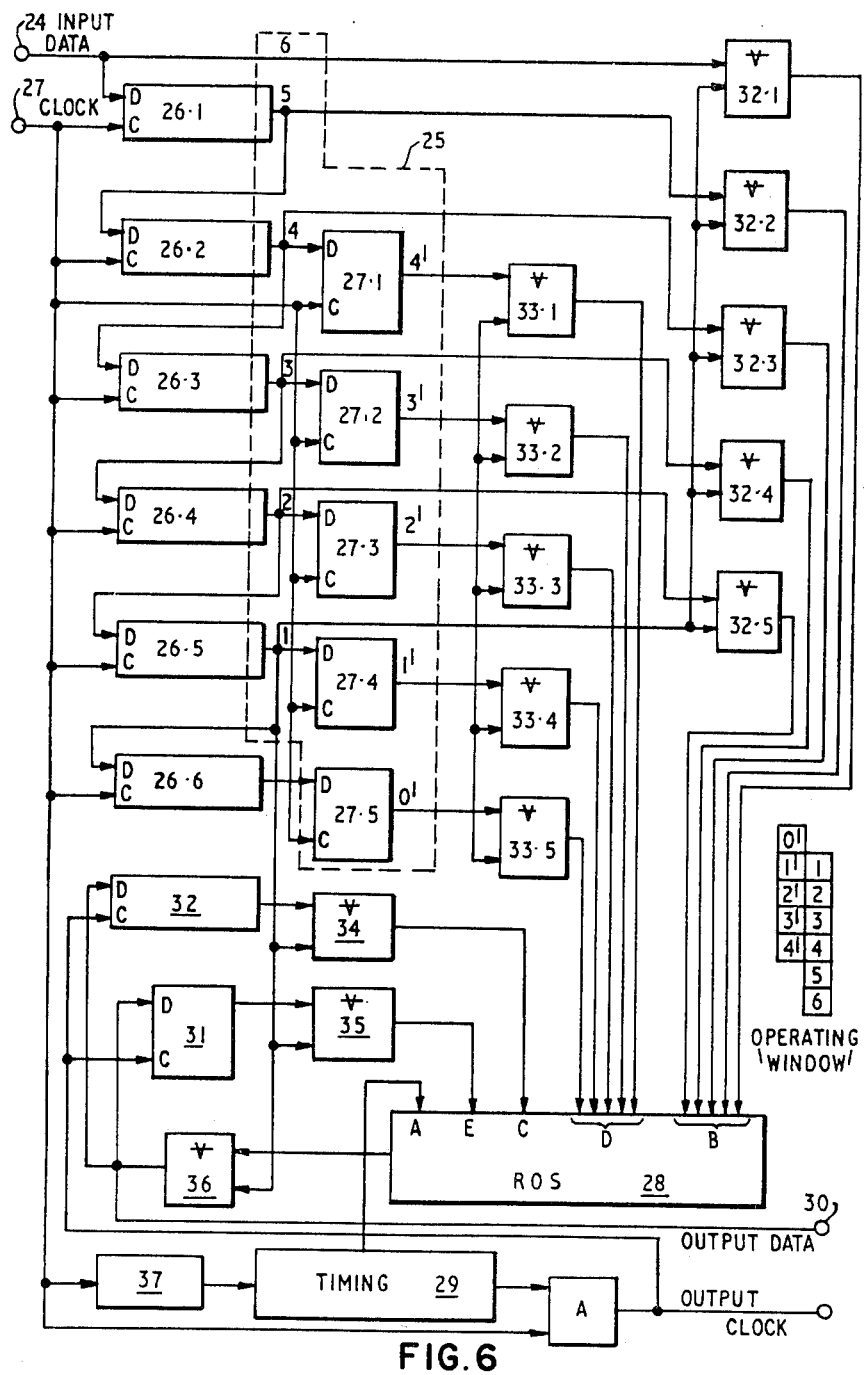
FIG. 6 shows apparatus for performing scale-change of input image data in a vertical direction.

The intermediate output bit stream representing the input image after scale-change in the row direction from terminal 12 (FIG. 3) is applied to input terminal 24 of the apparatus shown in FIG. 6 which performs the scale-changing operation in the column direction. The operating 'window' in this case is vertical with respect to the input image as shown in the inset and in dotted outline 25 in the FIG. 6. The pels for the current column are numbered 1 to 6 and for the preceding column 0' to 4'. In order to sample the bits passing through the 'window' six line buffers 26.1 to 26.6 are required to provide the necessary row delays. Since the input data has already been processed in the row direction, each line buffer 26 is only two-fifths of the length of the original scan line.

The six buffers are connected in series and the image data at terminal 24 is clocked through the buffers by the data clock pulses applied to clock terminal 27. The clock pulses are the same as the output pel clock in FIG. 3 and shown as waveform (g) in FIG. 5. During operation with the buffers full, the bit at the output of buffer 26.5 is six image rows behind the bit currently applied to the input of buffer 26.1.

Accordingly, the first pel of the sub-groups under investigation is represented by the bit at the output of the line buffer 26.5 and the other five pels in the current column 'window' are obtained from the outputs of line buffers 26.1 to 26.4 and the input to 26.1. The various buffer connections have been numbered with the 'window' pel order 1 to 6 for ease of identification of the bits representing the pels in the current column. The bits representing the pels in the previous column of the 'window' numbered 0' to 4' are derived from the outputs of five latches 27.1 to 27.5 connected to the output of the line buffers 25.2 to 25.6. The line buffer 26.6 is required to provide a delay equivalent to one input row for the input to latch 27.5. The output lines from the five latches have been numbered with the window pel order 0' to 4' for ease of identification of the bits representing the previous column of pels.

As with the scale-change apparatus for the row direction, the significance of the bit at the output from line buffer 26.5, that is the bit representing the first pel in the sub-group under investigation, is used to reduce the number of output words needed to be stored by the apparatus. If this bit is a '1' then the ten bits representing the remaining 'window' pels, the result bit for the previous sub-group in the current column, the result for the correspondingly positioned sub-group in the previous column are all inverted before they are supplied as address bits to a ROS 28. If the bit from the output of buffer 26.5 is a '0' then the bits are supplied as address bits to ROS 28 without inversion. A further single bit representing the width of the current sub-group is supplied as part of the ROS input address from timing circuits 29. The operation of the timing circuits will be described later with reference to FIGS. 7 and 8.

ROS 28 stores 8192 words and produces a single bit output word each pel time as a serial data output bit stream to output terminal 30. This bit stream contains redundant information and accordingly is sampled by an output pel clock signal (waveform (f) FIG. 8), supplied by timing circuits 29, to provide bursts of one line of data alternately for every two or three lines of input data. This sampled output data represents the input image after scale-change in the row and column direction.

The output bits from ROS 28 are applied to result latch 31, which is clocked by the output pel clock from timing circuits 29 to generate an output which represents the result for the corresponding sub-group of pels on the previous column. The ROS output is also supplied to a further line buffer 32, clocked by the output pel clock, to produce an output which represents the result for the previous sub-group of pels in the current column under investigation. The selective inversion of twelve of the address inputs is achieved automatically, as in the case of horizontal scale-change, simply by exclusively OR-ing the first bit from the current sub-groups with the bits supplied as the twelve ROS address bits. The output from line buffer 26.5 is therefore supplied as one input to XOR circuits 32.1 to 32.5 which obtain their second inputs from the input to line buffer 26.1 and the outputs from line buffers 26.1 to 26.4 respectively. The bits representing the pels in the current column under investigation are thus inverted on occurrence of a 1 bit at the output of buffer 26.5. The output from buffer 26.5 is applied as one input to XOR circuits 33.1 to 33.5 which obtain their second inputs from the outputs of latches 27.1 to 27.5 respectively. The bits representing the pels in the previous column are thus inverted on occurrence of a '1' bit at the output of buffer 26.5. The output from buffer 26.5 is further supplied as one input to XOR circuit 34 which receives the output from line buffer 32 as its second input. The bit representing the result for the previous sub-group of pels in the current column under investigation is inverted on occurrence of a '1' bit from buffer 26.5. Likewise, the outputs from buffer 26.5 and result latch 31 are supplied as inputs to XOR 35 in order to invert the bit representing the result of the corresponding sub-group of pels on the previous column whenever a '1' bit occurs at the output of line buffer 26.5. Finally, the presence of a '1' bit at the output of buffer 25.5 is used in XOR 36 to invert the single bit word supplied at the output of ROS 28.

Figure 8:
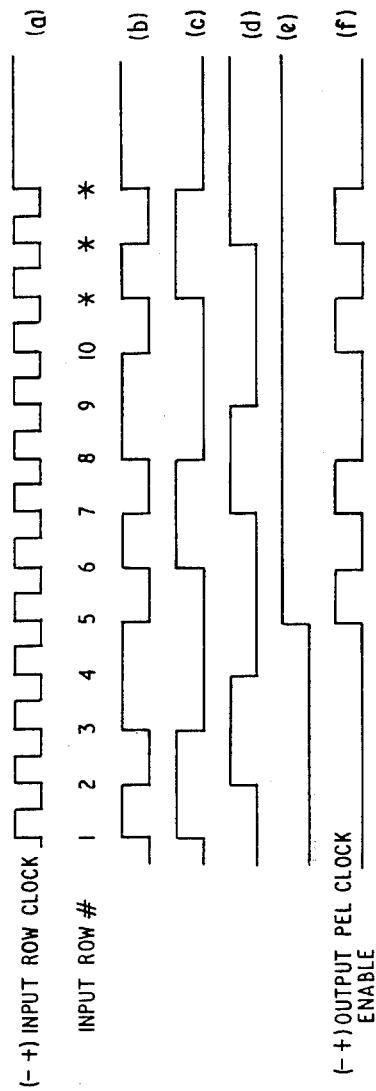
FIG. 8 shows signal waveforms at various points in the apparatus of FIG. 6.

It will be apparent that in order for the column scale-changing apparatus described above to function correctly it is necessary to clear the two first line buffers 26.1 and 26.2 so that they contain all zeros, reset the output latch 31 to zero, and clear the line buffer 32 before the image data is supplied to input terminal 24. Further, the previous column latches 27.1 to 27.5 must be reset to zero for the first column in each image row. The reset lines for this operation are not shown in FIG. 6. These extra rows with a pel value of '0' must be provided at the end of each image in order to flush out the line buffers 26.1 to 26.3. The reset pulses and the extra clock pulses can be simply derived using standard logical design. The timing circuits 29 are similar to timing circuits 13 (FIG. 3) as will be seen. However since the 'window' operates on pels in columns, valid output data is only available at output terminal 30 alternately every two and three input row times. Accordingly, the input clock for timing circuits 29 is a pulse train at the row repetition rate. The input row clock pulses shown as waveform (a) FIG. 8 are obtained from a column counter 37 fed with the input pel clock pulses from terminal 27 at its input.

Figure 7:
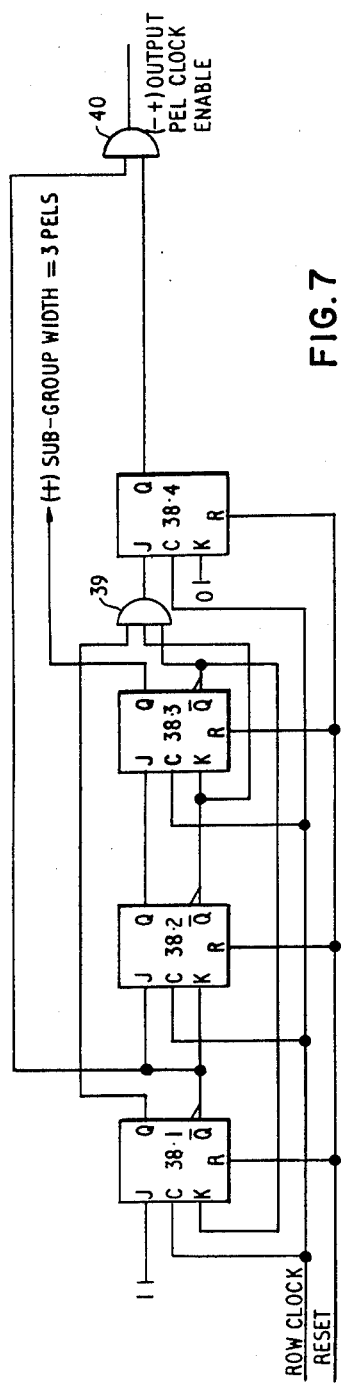
FIG. 7 shows details of timing circuits forming part of the vertical scale-changing apparatus of FIG. 6.

The timing circuits 29 are seen from FIG. 7 to consist of four interconnected JK flip-flops (FF) 38 and two AND-gates 39 and 40. The J input to FF38.1 is permanently tied to an up or '1' level and the K input to FF38.4 is permanently tied to a down or '0' level. The input row clock pulses, waveform (a) in FIG. 8 are supplied in parallel to the C inputs of all the flip-flops. The example chosen to illustrate the operation of the timing circuits has 10 scan rows of the input image with three extra rows marked * all storing zeros at the end in order to maintain operation of the apparatus until the last image scan line is cleared through the line buffers.

All flip-flops and the column counter 37 (FIG. 6) are reset to zero at the start of each new image scan.

The Q output from FF38.1 is shown as waveform (b) in FIG. 5, the Q output from FF38.2 as waveform (c) and the Q output from FF38.3 as waveform (d). It is seen that waveform (d) is alternately at an up or '1' level for the duration of 2 input pel row times and at a down or '0' level for 3 input pel row times. This signal is used therefore as the sub-group width signal required as an address bit for ROS 28 (FIG. 6).

The output pel clock signal required to clock the result latch 31 and the line buffer 32 is derived from the Q output from FF38.1. Since no output pel clock is required until the input data has reached the output of line buffer 26.5, the signal is suppressed during the first four input row times. This is accomplished by the logical combination of the Q output from FF38.1, the not Q output from FF38.2, and the not Q output from FF38.3 by AND-gate 39 the output from which is supplied as the J input to FF38.4. The resultant Q output from FF38.4 is shown as waveform (e) in FIG. 8 as an up or '1' level after four input row times and is used as a gating signal for the Q output from FF38.1 through AND-gate 40. The output from AND-gate 40 is shown as waveform (f) in FIG. 8 and is the output pel clock enable signal used to sample the data output signals supplied at terminal 30 from ROS 28 (FIG. 6). This signal, sampled for one input row scan line time (two-fifths the duration of the original unprocessed scan line) alternately every two and three line times represents the original input image after scale-change has been performed in the horizontal and vertical directions.

Figure 9:
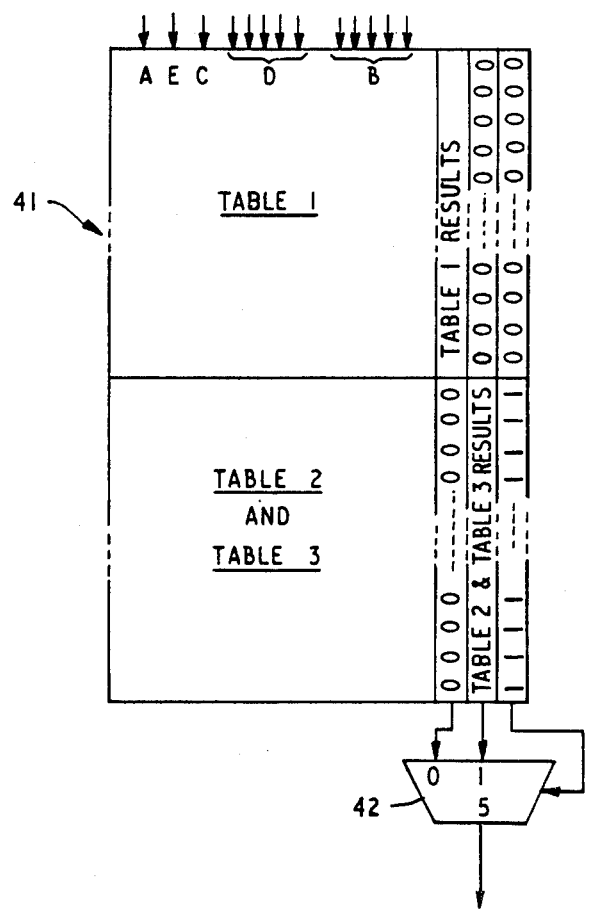
FIG. 9 shows a program logic array (PLA) which may be substituted for the read-only store (ROS) used in the apparatus shown in FIG. 3 and the apparatus shown in FIG. 6.

The embodiment described above uses a ROS to store and select the 8192 different output words. The fact that a large number of input addresses can be combined using 0,1 and X (don't care) states makes this table look up function particularly suited for implementation with a program logic array (PLA). Such an implementation is shown in FIG. 9. Here a PLA 41 is shown divided into an upper and a lower portion. The 39 different words listed in TABLE 1 are stored in the upper portion and the 60 different words listed in TABLE 2 and the 10 different words listed in TABLE 3 are stored in the lower portion. The 13 bit input address is applied to the PLA columns as shown and 3 output bits are generated for each resulting 'bit'. The outputs are arranged differently in the two portions of the PLA. Thus, the first output column in the top portion of the PLA contains TABLE 1 result bits, the second column and third column contain all 0's. In contrast the first column of the lower portion of the PLA contains all 0's, the second column contains the TABLE 2 and TABLE 3 result bits, and the third column contains all '1's. The outputs from the first and second output columns are fed to a funnel 42 which is controlled to pass the first or second column to its output in accordance with the value in the third column. Thus a '0' in the third column enables the funnel to pass the TABLE 1 result in the first output column as output whereas a '1' in the third column enables the funnel to pass the TABLE 2 or TABLE 3 result in the second column as output.

Since the algorithm personality is in the truth tables, easy, flexible design and maintenance is allowed. The tables can be stored in a ROS or PLA or even a random access memory which later would have the added advantage of allowing the tables to be changed dynamically for different scale change ratios or to suit various types of input data. Finally, although in general the scale-change ratio will be the same for the two coordinate directions of the input image it can be different if required.

Having thus described my invention, what I claim as new, and desire to secure by Letters Patent is:

1. A method for the lossy compression of an mxn array of Boolean coded pels (black/white) into a smaller pxq array of Boolean coded pels, the method steps comprise:
   forming a pxn array of Boolean coded pels from the mxn array, p being less than or equal to m, by encoding each ith vector in row major order with reference to the ith-1 vector through the substitution of a predetermined number of pels of the same color value in a weighted position for each run of pels, i lying in the range from 1 to n; and
   forming a pxq array of Boolean coded pels from the pxn array, q being less than or equal to n, by the encoding of each rth vector in column major order with reference to the rth-1 vector through the substitution of a predetermined number of pels of the same color value in a weighted position for each run of pels, r lying in the range from 1 to p.

2. Scale-changing apparatus for receiving raster-scanned data representing an image as a series of input bits indicative of an array of picture elements (pels) at a first pel resolution and for converting the data into a series of output bits indicative of an array of pels at a second lower pel resolution, comprising first scale-changing means operable on receipt of said series of input bits to convert selected sub-groups of said bits occurring in a first dimension of the image array each into one of a series of intermediate output bits, the significance of each output being being determined in accordance with a predetermined substitution of a number of pels of the same color value in a weighted position for each run of pels, and a second scale-changing means operable on receipt of said series of intermediate output bits to convert selected subgroups of said intermediate output bits occurring in a second dimension of the image array each into one of said series of output bits, the significance of each output bit being determined in accordance with a another substitution of a predetermined number of pels of the same color value in a weighted position for each run of pels, the size of the selected subgroups in the first and second dimensions being determined by the degree of scale changing required from said first to said second pel resolution.

3. Scale-changing apparatus for receiving raster-scanned data as a series of input bits indicative of an mxn image array of pels at a first pel resolution and for converting the data into a series of output bits indicative of a pxq image array of pels at a second lower pel resolution, comprising first scale-changing means operable in a first dimension of said image array to convert said series of input bits to a series of intermediate output bits indicative of a pxn image array of pels and a second scale-changing means operable in a second dimension of said image array to convert said series of intermediate output bits to said series of output bits indicative of said pxq image array, the scale-change operations performed by said first and second scale-changing means being in accordance with the substitution of a predetermined number of pels of the same color value in a weighted position for each run of pels.

* * * * *